United States Patent [19]
Main

[11] Patent Number: 5,684,348
[45] Date of Patent: Nov. 4, 1997

[54] AUTOMATIC DAMPING AND TRANSIENT SUPRESSING IMPROVEMENT IN SYNCHRONOUS MOTORS AND GENERATORS

[76] Inventor: Louis Main, 1709 Sunny Crest Ln., Bonita, Calif. 91902

[21] Appl. No.: 606,722

[22] Filed: Feb. 28, 1996

[51] Int. Cl.⁶ .......................... H02K 49/00; H02K 51/00
[52] U.S. Cl. .................. 310/75 D; 310/75 R; 310/100; 310/68 A; 310/67 R; 310/116; 464/23; 464/160
[58] Field of Search .................. 310/75 D, 75 A, 310/75 R, 96, 100, 162, 68 E, 68 A, 67 R, 79, 115, 209, 112, 114, 116, 74; 464/23, 157, 158, 160; 318/9, 10, 539, 700

[56] References Cited

U.S. PATENT DOCUMENTS

| | | | |
|---|---|---|---|
| 1,756,689 | 4/1930 | Jenkins | 310/74 |
| 2,784,331 | 3/1957 | Rodemann | 310/162 |
| 2,949,553 | 8/1960 | Benoit | 310/112 |
| 3,030,517 | 4/1962 | Gibbons | 310/74 |
| 3,187,213 | 6/1965 | Seidl et al. | 310/209 |
| 3,226,579 | 12/1965 | Bygdnes | 310/74 |
| 3,347,451 | 10/1967 | Vind | 464/160 |
| 4,021,015 | 5/1977 | Maeder et al. | 310/162 |
| 4,759,192 | 7/1988 | Bertram et al. | 464/162 |
| 4,817,461 | 4/1989 | Iseman | 310/112 |
| 4,874,974 | 10/1989 | Wu | 310/112 |
| 5,283,469 | 2/1994 | Forbes et al. | 310/74 |

*Primary Examiner*—Thomas M. Dougherty
*Assistant Examiner*—B. Mullins
*Attorney, Agent, or Firm*—Terry M. Gernstein

[57] ABSTRACT

A synchronous motor/generator is modified by mounting the conventional rotor on a sleeve that rotates freely on the main shaft rather than being fixedly mounted on the shaft. Limits to this rotation are incorporated in the design such that the maximum angular rotation of the rotor on the shaft equals half the stator advance that occurs during a complete full cycle of the AC stator winding voltage. In addition to smoothing transients, this configuration permits the machine to smoothly drop into the correct stator/rotor flux phase when it changes from a motor to a generator, and back into the correct phase for a motor, when the AC power is interrupted, and subsequently resumes, resulting in dropping a single cycle.

15 Claims, 3 Drawing Sheets

AUTOMATIC DAMPING AND TRANSIENT SUPRESSING IMPROVEMENT IN SYNCHRONOUS MOTORS AND GENERATORS

BACKGROUND OF THE INVENTION

This application is based on a provisional patent application, serial no. not yet known, filed Dec. 3, 1995.

Heavy duty electrical power motors and generators used as a primary or back-up electrical power source, are subject to sudden variations in the magnetic flux between the rotor and stator windings every time there is a phase shift between the rotor armature flux and the stator armature flux. This is particularly true of synchronous electrical motors and generators, both of which represent a single piece of equipment which will switch back and forth between the motor and generator modes depending on the manner of use.

Such undesirable phase shifts occur upon the sudden increase or decrease in the mechanical load or in the power fed to a synchronous motor, or the sudden increase or decrease in the electrical load or the torque applied to a synchronous generator, and can produce substantial voltage transients that cannot be tolerated by a critical generator load, or that can be fed back on the line power to a motor. Sensitive loads such as data processing equipment and medical instruments must be protected against such phase shifts by filtering and regulating the voltage with heavy, cumbersome and costly devices. Similarly, utilities must protect their installations against power surges fed back by a motor suddenly turned into a generator, by use of circuit breakers and other safety devices which increase the risk of blackouts.

When these sudden changes occur in the power supplied to, or in the load imposed upon, a synchronous power machine such as a motor or generator, large amounts of straining force and torque differences occur between the stator and rotor of the machine. This strain results in phase shifts and even frequency variations as the movement of the rotor is affected. The jerking movement of the rotating field can create transients both on the feeding line of a synchronous motor as well as on the output line of a synchronous generator. In the past, these problems have been dealt with by the use of external damping circuit devices, such as large inductive or capacitive auxiliary devices or loads.

In addition to random transients caused by load shifts, waveform continuity can be disrupted during shifts from normal generation equipment to emergency standby power supplies. Uninterruptible power supply systems are provided for switching from a normal line supply to a standby or backup power supply in the event of interruption, failure or inadequacy of the normal power supply. For true uninterrupted power, the switching must be instantaneous, and for cyclic power, the transition must be made without any change in phase, frequency or voltage.

Uninterruptible power supplies may require a transitional supply of power, such as a flywheel, to carry the load until the standby source of power can be brought up to speed and switched on-line. The flywheel may have to be combined with fast acting power loss sensors and solid state switches in order to keep flywheel weight and size reasonable. An example of a fast acting switch in shown in U.S. Pat. No. 4,827,152.

Holding cyclic electric power frequency and phase within tolerances for these additional devices for critical loads has also been a problem. Frequency changers (e.g., coupled rotating units at different phases at any one rotary position) and other complex devices have been used to control critical frequency and phase outputs from rotating electric machines for critical applications.

Commercially available uninterruptible power supplies may accomplish the switching quickly, but not without a significant flywheel weight. Depending upon rotating mass requirements, the flywheel may be a separate structure or incorporated in the construction of the motor, shaft, or rotor. For critical loads where even a small change in frequency can cause problems, the flywheel size requirement may become impractical. The large angular momentum also creates problems in startup and performance, when acceleration or deceleration of the spinning mass is demanded. Even fairly massive flywheels and fast acting switches may have to be supplemented by spinning stand-by dual drives, and other devices. An example of additional devices that may be required is shown in U.S. Pat. No. 3,458,710.

The above-described phenomena have been particularly problematic in the design of, and operation of, standby power units which must be brought up to speed and switched in and out of power grids within extremely short period of time. Significant advantages and improvements are achieved by allowing the stator of such a synchronous machine to freely oscillate over a limited range as disclosed in U.S. Pat. Nos. 5,311,062 and 5,434,454. However, the sheer mass of the stator windings and the motor or generator casing in which it is housed can result in the accumulation of tremendous kinetic energy during the free movement of the stator. This can require a great deal of attenuation at the end of each stator migration to avoid destructive impacts against stops and other barriers.

There is a need for a simpler and more effective power back-up system which can instantaneously detect any failure of the line power and synchronously switch to a stand-by power supply without resorting to massive kinetic energy storage device, or complex phase-and-frequency maintenance circuitry.

SUMMARY OF THE INVENTION

The instant invention results from an attempt to limit these undesirable spurious line transients by attacking the problem at its source, inside the synchronous power machinery.

The inventor has researched and experimented with the damping of the internal forces caused by supply line voltage changes. Specifically, it has been attempted to damp these reactive forces by permitting limited rotational movement of the magnetic field of the rotor relative to the shaft on which it is mounted, which also changes the phase of the rotor field relative to the stator field since the stator flux-shaft phase relation remains unchanged. This approach is related to another tact disclosed in U.S. Pat. Nos. 5,311,062 and 5,434,454, wherein the field coils of the stator are permitted to rotate relative to the machine body, under action of a bias. But by permitting the rotor field to rotate, rather than the stator flux, a different effect is achieved, with commensurate advantages and no known disadvantages.

First, the new approach is at least 15% more efficient in terms of equipment size. The prior art movable stator design requires substantial mounting and casing modifications that add bulk and weight which are not needed in the new approach. For the same reason, the cost of producing the instant invention is estimated to be 40% below that of the mobile stator unit.

This new design is superior in operational characteristics as well. The machine provides ride-through power without the re-generating harmonics of the referenced design. By allowing the stator to remain stationary, as it should, and permitting migration of the rotor field in a limited rotational arc, no kinetic energy build-up will occur, eliminating the shock damage that takes place in the heavier mobile-stator design, and providing a smoother transition during power failure. As a consequence of the large kinetic energy build-up during stator movement because of the structural mass of the prior-an design stator, the physical size of the machine and thus the voltage capacity would be greatly limited in all practicality, unlike the present design, which has no theoretical or known practical ceiling on power capacity caused by incorporation of the slippable rotor.

The mobile stator design has an inherent built-in frequency loss during transition which creates additional harmonics with frequency spikes, and releases a great deal of kinetic energy build-up during stator rotation, slamming the movable stator into the mechanical stops. This is a hazard not only to the machine, but possibly to personnel as well. The new design eliminates the harmonics and provides a small frequency gain, making the transition virtually invisible and very smooth.

In the dual motor/generator version where a total isolation generator is required for extremely critical loads, the movable stator technology would be next to impossible to use in an actual manufactured installation. It would be very difficult and awkward to join two stators together physically and suspend them for free rotation. This would put all the weight, of the stator and the rotor, on one shaft, which must support the entire machine. In the instant design, only the normal weight distribution of the rotor on the shaft will occur.

In a nutshell, the rotating rotor design is simple to construct, cost effective, harmonic-free, will not build up destructive quantities of kinetic energy, and can be ganged together rotor-to-rotor without problem.

DETAILED DESCRIPTION OF THE PREFERRED EMBODIMENT

Figure 1:
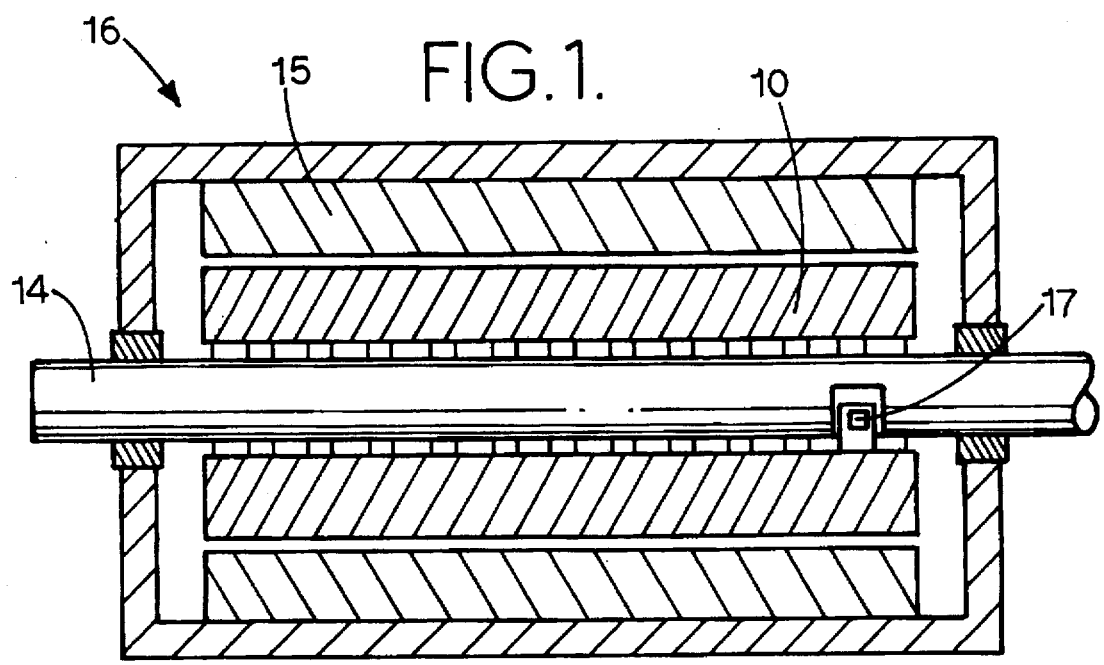
FIG. 1 is a diagrammatic cross-sectional view of the machine cut orthogonally of the shaft.
Figure 2:
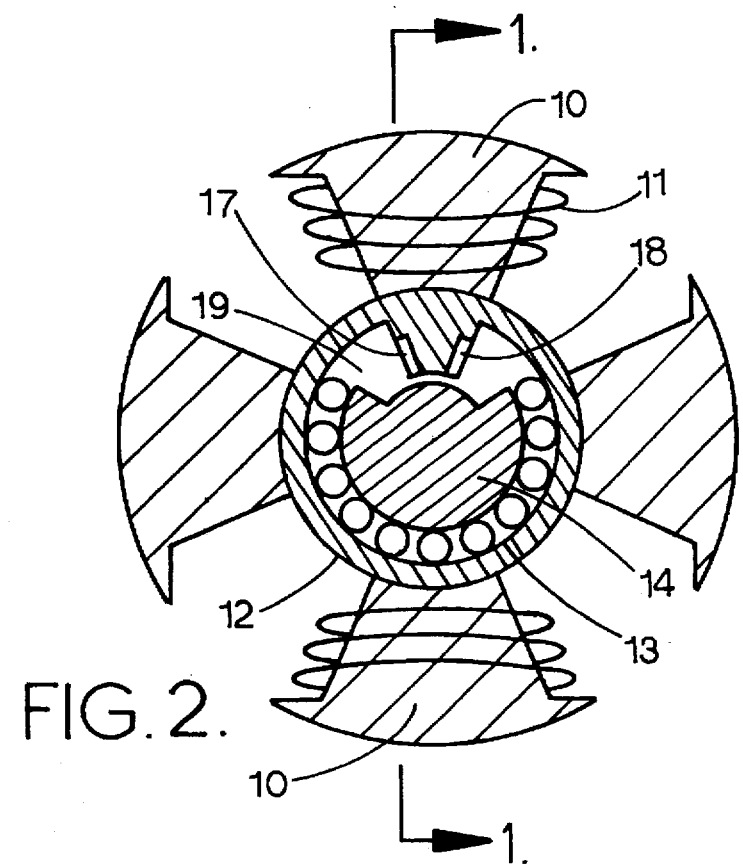
FIG. 2 is a diagrammatic end elevation view of the machine.

This invention is diagrammatically shown in FIG. 1 wherein the rotor 10 with coil windings 11 is mounted on a sleeve 12 which is rotationally and concentrically mounted on bearings 13 on the shaft 14 of the machine 16. This allows limited free movement of the sleeve in relation to the shaft over an arc of up to 360 degrees divided by the number of poles in the machine. Limit switches 17 and 18 properly positioned on the shaft or on the sleeve are used to detect the relative movement of the field in relationship to the shaft as an indication of a change in the supply or load of the machine. In the illustrated embodiment, the switches ride on the rotor and extend into the slot 19 in the shaft, where they butt up agianst the respective sidewall 21 as the rotor shifts between driving and driven modes. Appropriate corrective measures such as the switching in or out of backup power equipment can be done in response to switch indications. Most of the transient energy that would normally affect the line will be absorbed overcoming the inertia of the rotating fields.

Figure 4:
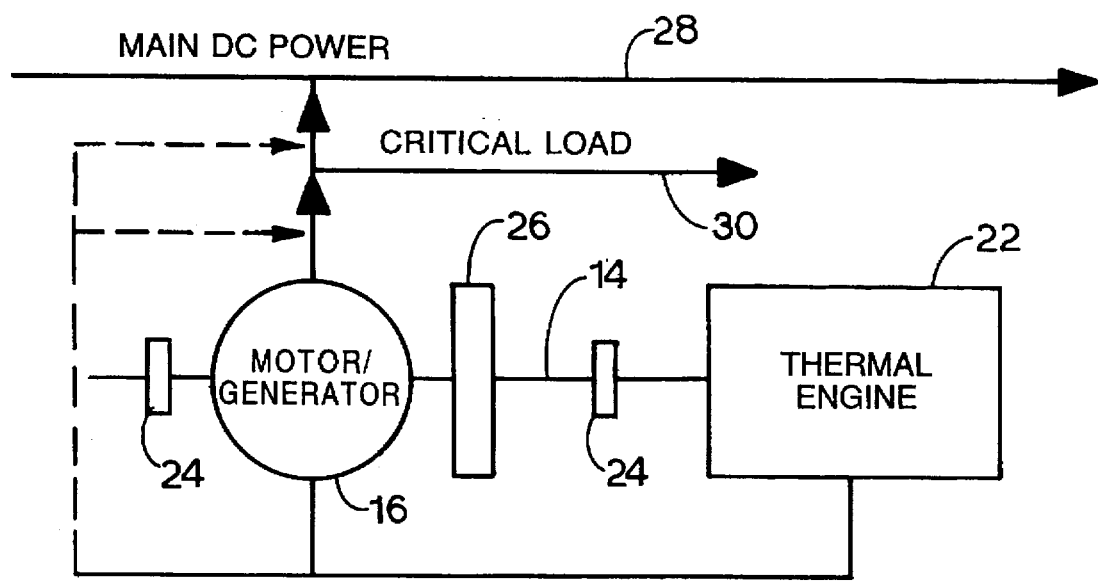
FIG. 4 is a diagrammatic view of a typical installation.
Figure 5:
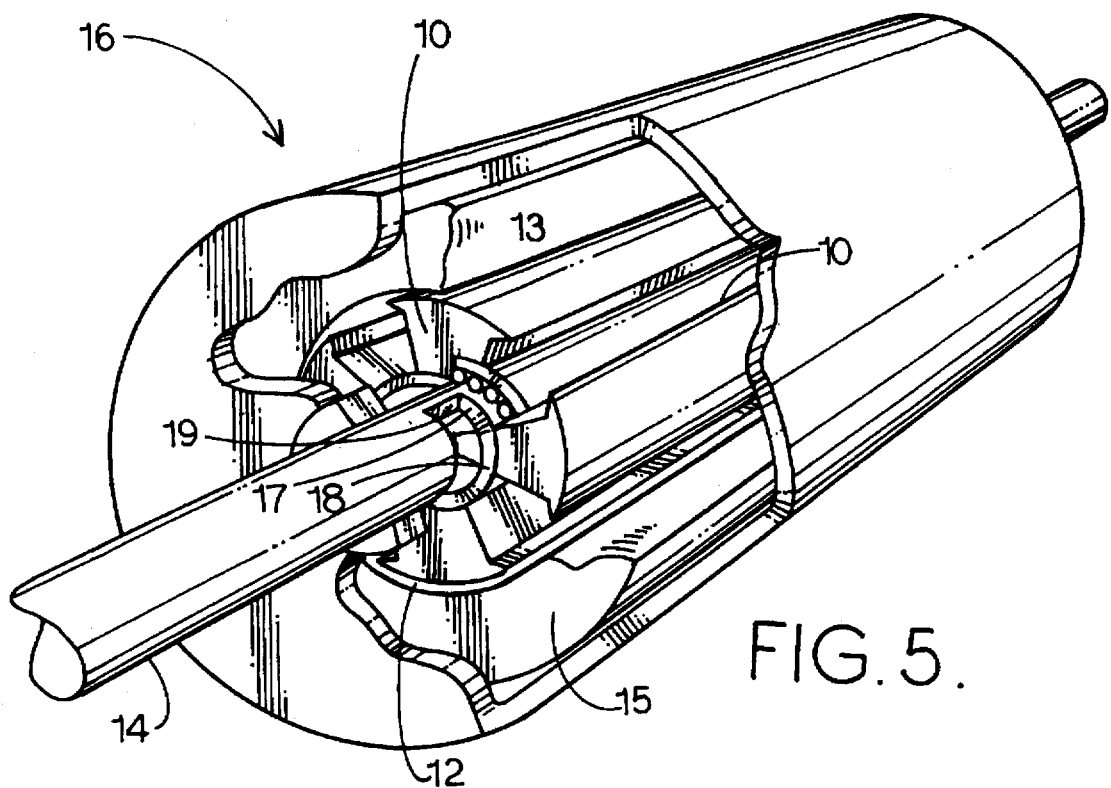
FIG. 5 is a diagrammatic detail of the shaft slot and the limit switches operative therein.
Figure 6:
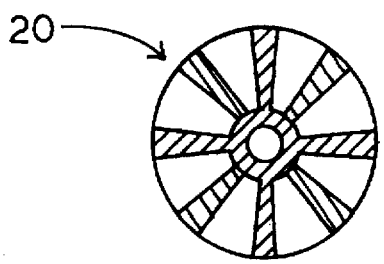
FIG. 6 is a cross-sectional view of the slip-link of FIG. 3.

A typical installation is shown in FIG. 4, wherein the motor/generator 16 shares shaft 14 with the thermal engine 22 through clutch 24, there being a flywheel 26 mounted on the shaft. As the motor operates, powered from AC line 28, the rotor is the driving member and is as far advanced as limits permit relative to the shaft, such that the limit switch 18 is actuated. In the event of a voltage drop in the line 28, which would immediately threaten the critical load 30, the rotor would instantly lose momentum and the shaft, powered now by the flywheel 26, would overrun the rotor and effect a phase change. At the same time it would actuate switch 17 which in turn actuates the standby generation equipment. When the power comes back up, the opposite action occurs. As the power reaches full, it begins to drive the generator as a motor, and the rotor overrunns the shaft, so that the total loss of cycle time from both switch-overs is a single cycle of power, which can be made up later if the load requires.

Figure 3:
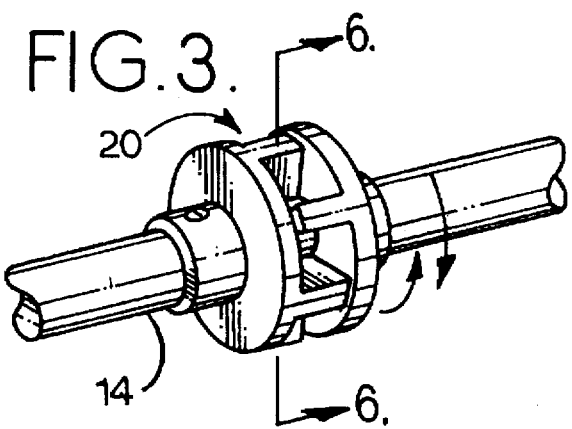
FIG. 3 is a diagrammatic view of a modification of the machine in which the shaft incorporates the slip-link outside of the machine proper.

An alternative embodiment is shown at 20 in FIG. 3. In this embodiment the slippage allowed between the rotor and shaft is incorporated in the shaft itself. Although not as closely coupled as in the former embodiment, this would nonetheless have the effect of incorporating the correct rotational play between the members. The limit switches are not shown in this figure, but would be needed to control the system, shown in FIG. 4, typical of either implementation of the invention.

The sensitive load is separated from the main line and the motor/generator by two circuit breakers.

When the power fails, the circuit breaker between main power and the load opens and instantly the thermal generator is turned on. At the same time, the motor/generator, which was formerly a motor, is now a generator, and in the instant that it takes to power up the thermal machine, the generation provided by the flywheel driving the motor as a generator prevents it from losing more than half a cycle in the conversion to standby power.

On return of the main power, the surge to the field coils of the rotor causes it to snap into the driving mode, as it overruns the shaft for an instant, causing the rotor to advance on the shaft and actuate the switch 18, which reverses the effect of the switch 18, with the overall effect of dropping one cycle in the (usually) 60-Hz. power supply.

I claim:

1. A synchronous electrical machine defining a rotational axis and having a stator, a shaft member coaxially rotatably mounted within said stator and having a rotor member mounted thereon, and field windings on said rotor member, one of said members being a driving member and the other of said members being a driven member comprising:

(a) means between said rotor member and said shaft member for coupling said rotor member and said shaft member and providing a degree of coaxial rotational freedom between said members whereby one of said members is rotatable with respect to the other member of said members between rotational limits;

(b) limit means incorporated into said machine for defining rotational limits to said coaxial rotational freedom;

(c) limit switch means operative with said limit means for energizing or de-energizing an external circuit upon a respective limit being reached, to control the source of power to an external load.

2. A phase adjuster according to claim 1 wherein said limit means provides limits confining rotation between said members to an angle equal to 360° divided by the number of poles in said machine.

3. An adjuster according to claim 1 wherein at least a portion of said shaft member is an output shaft and said slack coupling is a slip joint in said shaft.

4. An adjuster according to claim 2 wherein said slack coupling is a sleeve journalled on said shaft which mounts said rotor and field windings such that a magnetic field created by said windings has the capability of angularly migrating with said sleeve relative to said shaft between said limits.

5. An adjuster according to claim 1 wherein said machine has stator windings connected to a source of AC power through an AC power switch, and actuator means trigered by said limit swiitch means and being operatively connected to said power switch for actuating said same when relative movement occurs between said members, such that when said shaft member switches from being the driven member to being the driving member, said actuates opens said power switch, and vice-versa.

6. An adjuster according to claim 5 and including a switched auxiliary power source and with said sensor being operatively connected thereto such that said auxiliary power source is energized when said sensor opens said AC power switch.

7. A self-adjusting synchronous electrical machine comprising:
   (a) a stator defining a rotational axis and being wound with stator windings;
   (b) a rotor member having field windings thereon and being coaxially rotatably mounted within said stator;
   (c) a shaft member being coupled in axially aligned driving relationship with said rotor member;
   (d) means between said rotor member and said shaft member for coupling said rotor member to said shaft member and providing a degree of coaxial rotational freedom between said members wherein said members are rotatable with resect to each other;
   (e) limit means on said means between said rotor member and said shaft member for coupling said rotor member to said shaft member for defining limits to said coaxial rotational freedom; and
   (f) limit switch means coupled to said limit means for energizing or de-energizing an external circuit upon a limit being reached to control the source of power to an external load.

8. A machine according to claim 7 wherein said limit means provides limits confining rotation between said members to an angle equal to 360° divided by the number of poles in said machine.

9. A machine to claim 7 wherein at least a portion of said shaft member is an output shaft and said slack coupling is a slip joint defined in said output shaft.

10. A machine according to claim 8 wherein said slack coupling is a sleeve journalled on said shaft which mounts said rotor and field windings such that a magnetic field created by said windings has the capability of angularly migrating with said sleeve relative to said shaft between said limits.

11. A machine according to claim 10 operating as a motor wherein said stator windings are connected to an AC power destination, and through an AC power switch to an A.C. line from an AC power supply, said rotor windings are connected to a D.C. power supply, and including a voltage regulator for regulating D.C. voltage supplied to said rotor windings, said regulator being operatively connected to said AC line and said power switch and being sensitive to a voltage drop in said AC line such that upon voltage in said AC line falling below a predetermined minimum, said regulator opens said AC power switch resulting in turning said motor into a generator.

12. A machine according to claim 8 wherein said limit means is defined by the geometry of said coupling between said members such that the same collide at the limits of angular travel.

13. A machine according to claim 12 and including at least one limit switch between said members to be actuated at their limits of angular travel to indicate role reversal between the driven and driving members.

14. A method of attenuating transients between stator and rotor magnetic fields in a synchronous motor having a stator with stator windings and rotor with rotor windings, and a rotary shaft, comprising:
   (a) providing a sleeve which is close-fitting on said shaft for rotational motion about the axis thereof;
   (b) mounting said rotor with the rotor windings thereon, on said sleeve such that both rotor and sleeve are rotatable about the axis of said shaft;
   (c) coupling said rotor to said shaft;
   (d) permitting said rotor to rotate relative to said shaft within limits;
   (e) defining stops to limit the rotational motion of said sleeve with respect to said shaft to a predetermined angle; and
   (f) providing a limit switching means on said rotor and on said shaft and using said limit switching means to control power to an external circuit.

15. A method according to claim 14 wherein said stops are positioned to limit the relative rotation of said rotor with respect to said shaft to an angle equal to 360° divided by the number of poles in said machine.

* * * * *